(12) United States Patent
Ho

(10) Patent No.: US 8,186,069 B1
(45) Date of Patent: May 29, 2012

(54) MULTI-BEAM LASER OPTICAL ALIGNMENT METHOD AND SYSTEM

(76) Inventor: David Gian-Teh Ho, Diamond Bar, CA (US)

(*) Notice: Subject to any disclaimer, the term of this patent is extended or adjusted under 35 U.S.C. 154(b) by 269 days.

(21) Appl. No.: 12/730,111

(22) Filed: Mar. 23, 2010

(51) Int. Cl.
*G01B 11/26* (2006.01)

(52) U.S. Cl. .............................. 33/286; 33/228; 356/154

(58) Field of Classification Search .................. 33/286, 33/293, 227, 228; 356/138, 153, 154; 359/641
See application file for complete search history.

(56) References Cited

U.S. PATENT DOCUMENTS

| | | | | | |
|---|---|---|---|---|---|
| 2,811,074 | A | * | 10/1957 | Davidson | 356/154 |
| 3,574,467 | A | * | 4/1971 | Paine et al. | 356/153 |
| 3,778,169 | A | * | 12/1973 | Adams | 356/399 |
| 3,907,435 | A | * | 9/1975 | Roodvoets | 356/153 |
| 3,915,575 | A | * | 10/1975 | Sick | 356/152.2 |
| 4,155,648 | A | * | 5/1979 | Ferguson | 356/140 |
| 4,681,439 | A | * | 7/1987 | Shoemaker | 356/154 |
| 4,772,122 | A | * | 9/1988 | Kasner | 356/139.05 |
| 4,804,270 | A | * | 2/1989 | Miller et al. | 356/508 |
| 6,025,908 | A | * | 2/2000 | Houde-Walter | 356/153 |
| 6,266,143 | B1 | * | 7/2001 | Peterson et al. | 356/399 |
| 6,366,349 | B1 | * | 4/2002 | Houde-Walter | 356/153 |
| 6,628,405 | B1 | * | 9/2003 | Perchak | 356/506 |
| 6,774,366 | B1 | * | 8/2004 | Friedman et al. | 250/328 |
| 2007/0121101 | A1 | * | 5/2007 | Hinderling et al. | 356/138 |
| 2007/0263284 | A1 | * | 11/2007 | Glatter | 359/423 |

\* cited by examiner

*Primary Examiner* — R. A. Smith
(74) *Attorney, Agent, or Firm* — Christie, Parker & Hale, LLP

(57) ABSTRACT

A laser collimator for collimating optical elements of a viewing device, such as a telescope. The laser collimator includes three or more lasers positioned on a plane in front of the optical elements of the viewing device for generating three or more respective incident laser beams directed towards the optical elements to simulate a large aperture coherent light; a reflecting mirror positioned at an eyepiece of the viewing device for reflecting the three or more incident laser beams; and a target display on the same plane or a plane parallel to the plane on which the three or more lasers are positioned for displaying the three or more incident laser beams reflected from the reflecting mirror and the optical elements of the viewing device, as three or more respective dots.

19 Claims, 10 Drawing Sheets

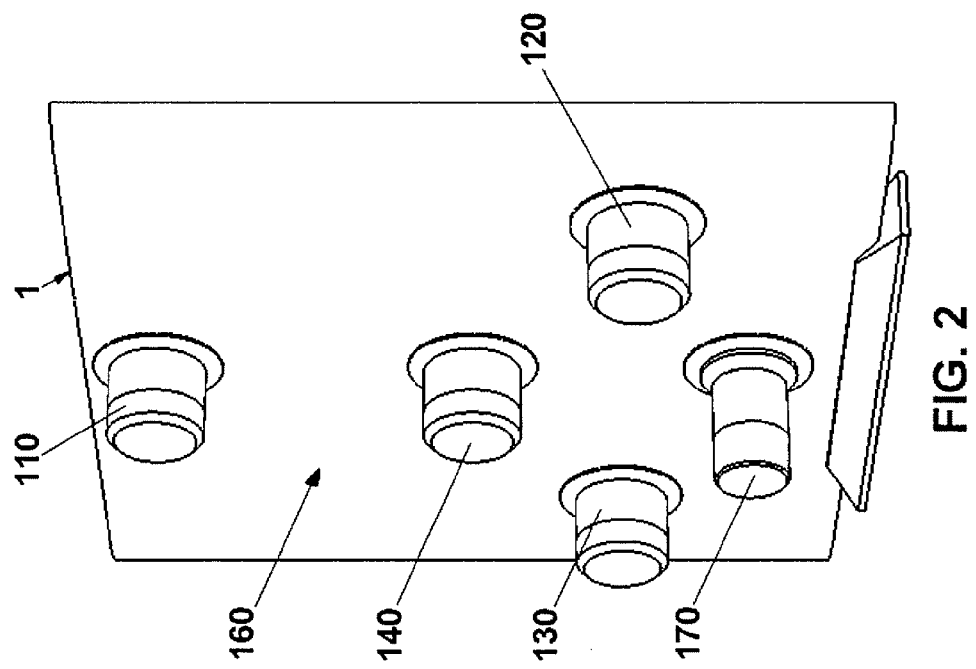
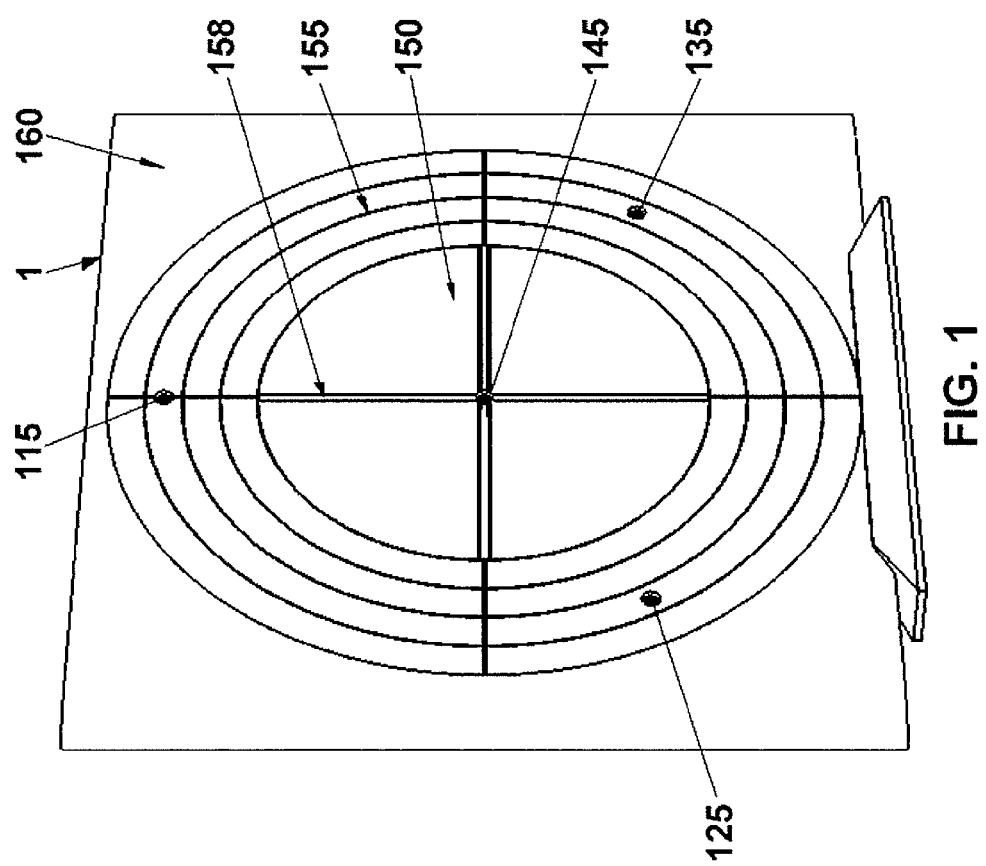

1
MULTI-BEAM LASER OPTICAL ALIGNMENT METHOD AND SYSTEM

FIELD OF THE INVENTION

The present invention relates to collimating or optically aligning the optical elements of a viewing device and more specifically to a multi-beam laser optical alignment method and system that may be used for viewing devices, such as telescopes.

BACKGROUND

Most of the viewing devices, such as telescopes often need to be optically aligned. The Cassegrain telescope (CT) has evolved into various designs and has gained its popularity because of its compact and simple to produce design. With all the various CT designs, the conventional process of star collimation is and has always been the most effective method for adjusting tip-tilt of the secondary mirror relative to the primary mirror.

In order to achieve an accurate conventional star collimation, an astronomer normally requires good observing conditions with no cloud, no wind, stable temperature, no light pollution, a well-aligned telescope mount tracking system, telescope optical tube assembly (OTA) thermal equilibrium, and a visible magnitude star. However, the visual quality of the reference star is greatly affected by the above-mentioned conditions, most of which are not in the astronomer's control.

Therefore, there is a need for a new process and system for an optical alignment method and system that can be accomplished in a compact space and under a more controllable environment.

SUMMARY

The present invention relates to a method and system for collimating or optically aligning the optical elements of both reflecting and refracting telescopes. In some embodiments, the present invention uses a near-field double-pass process to achieve collimation on the adjustable optical elements by a far-field multi-beam spots sampling device positioned in less than the focal length of the optical elements of the telescope, and a plano mirror installed at the near focal point of the optical system of the telescope.

In some embodiments, the present invention is a laser collimator for collimating optical elements of a viewing device, such as a telescope. The laser collimator includes three or more lasers positioned on a plane in front of the optical elements of the viewing device for generating three or more respective incident laser beams directed towards the optical elements to simulate a large aperture coherent light; a reflecting mirror positioned at near focal point of the viewing device for reflecting the three or more incident laser beams; and a target display on the same plane or a plane parallel to the plane on which the three or more lasers are positioned for displaying the three or more incident laser beams reflected from the reflecting mirror and the optical elements of the viewing device, as three or more respective dots.

The laser collimator may further include an alignment laser positioned on the same plane on which the three or more lasers are positioned for generating a diffracted light beam parallel to the three or more incident laser beams to center align the laser collimator with an optical axis of the viewing device.

In some embodiments, the present invention is a method for collimating optical elements of a viewing device. The method includes: placing a reflecting mirror at near a focal point of the viewing device; generating three or more incident laser beams directed towards the optical elements of the viewing device to simulate a large aperture coherent light; displaying the three or more incident laser beams reflected from the reflecting mirror and the optical elements of the viewing device on a display, as three or more respective dots; and adjusting one or more of the optical elements of the viewing device until the three or more respective dots displayed on the display are symmetrical. The method may further include generating a diffracted light beam parallel to the three or more incident laser beams to center align the three or more incident laser beams with an optical axis of the viewing device. The diffracted light beam may by a crosshair light pattern.

In some embodiments, the present invention is a method for collimating optical elements of a viewing device. The method includes generating three or more incident laser beams directed towards the optical elements of the viewing device; and simultaneously displaying the three or more incident laser beams reflected back from the optical elements of the viewing device to collimate the optical elements of the viewing device.

The viewing device may be a reflector telescope, a refractor telescope, a microscope, a binocular, a large aperture camera, or an imaging satellite.

BRIEF DESCRIPTION OF THE DRAWINGS

FIG. 1 is a front perspective view of a laser collimator, according to some embodiments of the present invention.

FIG. 2 is a perspective rear view of a laser collimator, according to some embodiments of the present invention.

DETAILED DESCRIPTION

Figure 3A:
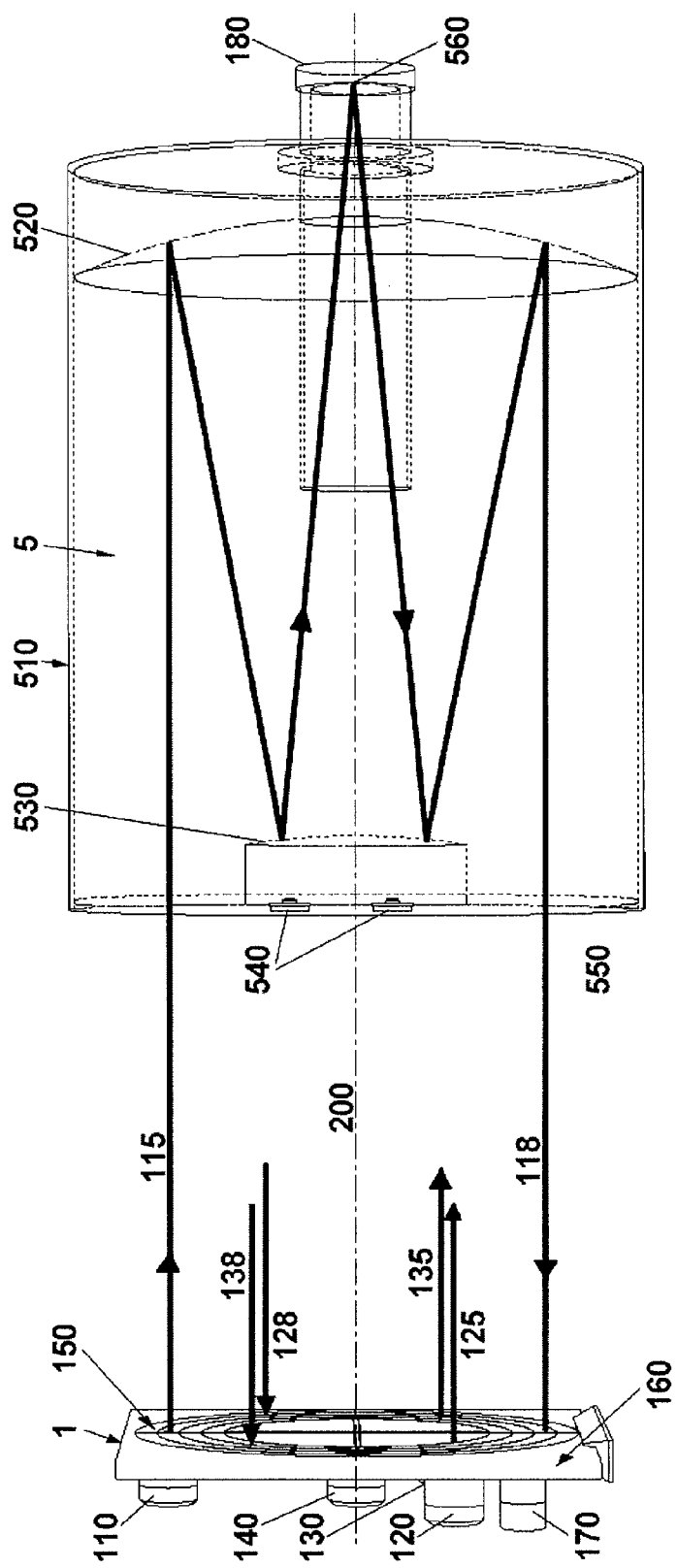
FIG. 3A is a perspective side view of the laser beams tracing from a laser collimator to the collimating optical elements of a telescope.

The present invention is a multi-beam laser optical alignment method for collimating or optically aligning the optical elements of a viewing device such as a variety of different telescope types, microscopes, binoculars, large aperture cameras, imaging satellites, and the like.

In the case of telescopes, the system and method of the present invention simulate the light path of a distance star, that is a large aperture plane wave at far-field, with three or more evenly spaced collimated parallel lasers entering a collimating optical system to spot sample the optics of the telescope for axial alignment of the adjustable optical elements of the viewing device. Near the focal point at the eyepiece location, a (flat) reflecting mirror is installed reflecting the lasers back to the collimating laser plane mounted on a target display. The user then aligns the appropriate adjustable optical elements of the viewing device to obtain a symmetric display of the three (or more) projecting lasers on the target display, to achieve collimation. The laser beams of this near-field alignment process double pass the optical system of the viewing device by three or more evenly spaced collimated laser beams entering the optical system through all its optical elements, and reach the end of the optical system. A reflecting mirror placed at the end of the optical system (near focal point) reflects the laser beams back to the same laser plane (the target display) through the same optical elements. As a result, the alignment accuracy of the optical system of the viewing device increases.

The present invention collimates the viewing device (e.g., a telescope) in a compact space, by positioning a collimator system within the focal point distance of the telescope, with the final viewing focus settings of the viewing device. With its short range capability, the user (astronomer) can perform collimation indoors without being subjected to weather conditions. Additionally, the present invention saves observing time by collimating the telescope and preparing the viewing programs at dusk or before dawn without the influences of the external environmental conditions.

In some embodiments, the present invention utilizes a clear and simple-to-read, target display for the telescope alignment diagnostic. This target display can be stationed within the focal distance of the telescope which allows the astronomer to collimate without visual subjectivity (parallax) through the eyepiece.

FIG. 1 is a front perspective view of a laser collimator, according to some embodiments of the present invention. The laser collimator 1 includes three equally spaced parallel collimating laser beams 115, 125, and 135; and a center guiding laser beam 145 located on a laser collimator frame 160, which includes a target display 150. The three equally spaced parallel laser beams 115, 125, and 135 are generated from three respective collimating laser devices (110, 120 and 130, respectively, shown in FIG. 2). The center guiding laser beam 145 is generated from a fourth laser device (140 in FIG. 2), which projects a crosshair pattern to assist proper aiming of the laser collimator 1 to the optical axis of the telescope. The target display 150 provides a clear visual display with concentric target rings 155 for collimation references of the returning laser beams reflected from the optical elements of the viewing device being collimated.

The collimation system and method of the present invention co-aligns the collimating laser beams 115, 125, and 135 with the optical axis of the none adjustable optical elements of the telescope, for example, the primary mirror of a CT and its derivative design, or the focuser of a refractor telescope. In the center of the three collimating parallel laser beams 115, 125, and 135, another laser beam 145 is used to project diverging crosshair pattern parallel pointing with the three collimating laser beams as an aiming guide for the laser collimator 1 and the telescope. During the adjustment of the optical system of the telescope, the user can iterate the aiming process to ensure the accuracy of the adjustment.

The center cross 158 on the target display 150 provides visual display on the returning crosshair projected from the crosshair laser 145 for the purpose of co-alignment of the laser collimator 1 and the optical axis of the collimating telescope. As a result, the user standing between the laser collimator 1 and the telescope can easily adjust the necessary optical elements of the telescope to achieve a symmetry display of the three projected laser beams reflected on the target display.

In some embodiments, the laser collimator 1 is capable of collimating the optics of a reflector and refractor telescope or similar optical system with one adjustable optical element including, but not limited to, one mirror or lens in the optical train, minus the eyepiece element, which is not part of the collimating optical element on the telescope.

FIG. 2 is a perspective rear view of a laser collimator, according to some embodiments of the present invention. As shown, the three collimating lasers 110, 120, and 130 and the center guiding laser 140 are placed on the back of the frame 160. A battery compartment 170 powers the four lasers. Although, three laser devices 110, 120 and 130 are shown, the invention is not limited to three, and other larger numbers of collimating lasers are possible.

The laser collimator frame 160 holds the equally-spaced collimating lasers 110, 120, and 130 at an adjustable or predetermined distance depending on the aperture size of the viewing device or telescope that is being collimated. The mechanical structure of the laser collimator frame 160 can be in any shape, for example, in plate, spider bars, ring bars, etc. shapes. The material of the frame 160 requires conforming to none flexing to hold the installed lasers on the same plane keeping the projecting laser beams collimated or in parallel, which simulate a large aperture coherent light. In some embodiments, anodized and harden aluminum plate is used as the main material for the frame 160 to keep the structure rigid and lightweight.

Figure 3B:
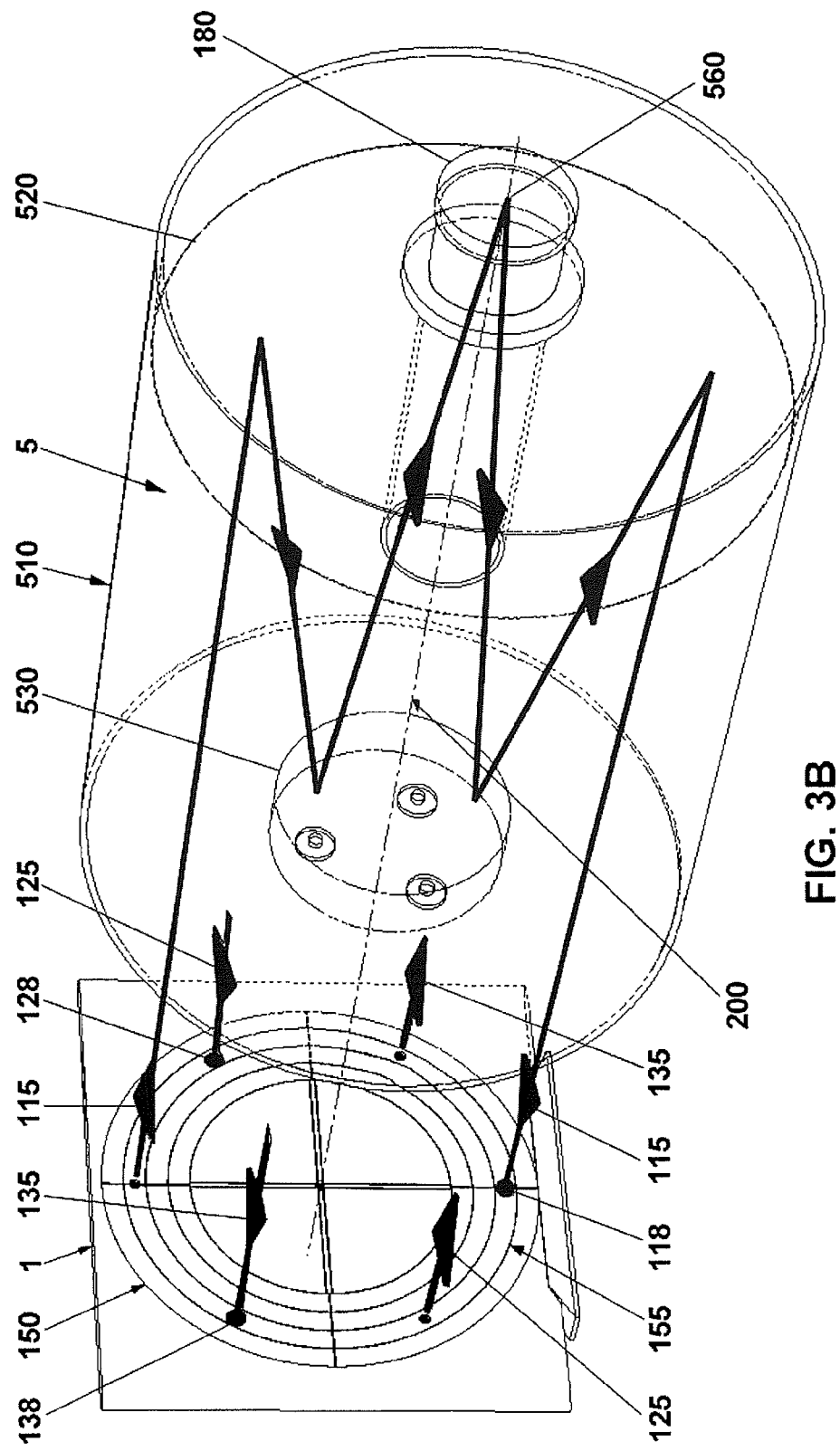
FIG. 3B is a perspective rear view of three collimating laser beams tracing from the laser collimator to the telescope, according to some embodiments of the present invention.

FIG. 3A is a perspective side view of the laser beams tracing from a laser collimator to the collimating optical elements of a telescope and FIG. 3B is a perspective rear view of three collimating laser beams tracing from the laser collimator to the telescope, according to some embodiments of the present invention. FIGS. 3A and 3B show the projection of the returning lasers 118, 128, and 138 on the target plate 150 at mirrored position. In this exemplary embodiment, the collimating optical system 5 is a Schmidt-Cassegrain Telescope (SCT), which is a derivative design of a classic Cassegrain telescope. The SCT includes an optical tube assembly (OTA) 510, a primary mirror 520 with a center hole, a corrector plate 550 in front holding a secondary mirror 530, and a visual back at the focal point 560.

A three-point spot sampling on optical surfaces (mirrors) 520 and 530 is sufficient to determine the tip-tilt (axial alignment) adjustment of the optical element 530. Thus, the collimation process for the SCT of FIGS. 3A and 3B employs three equally spaced collimated parallel laser beams 115, 125, and 135, simulating an equivalent large aperture coherent light entering the collimating optical train first passing through a corrector plate 550, then reflected on the primary mirror 520 and again reflected on the secondary mirror 530 to a reflecting flat mirror 180, which is placed at the focal point 560. The projected locations of the three laser dots 118, 128, and 138 on the target display 150 indicate the optical axial alignment error in the telescope 5 by comparing symmetrical displacement of the three dots 118, 128, and 138 to the concentric rings 155 on the target display 150.

For example, if the three projecting laser dots 118, 128, and 138 do not form a symmetrical ring corresponding to the concentric ring 155 on the target display, it indicates that the secondary mirror 530 is out of alignment. To correct the axial alignment error from the telescope 5, the user, standing between the front of the telescope 5 and the laser collimator 1, adjusts the proper axial alignment screws 540 on the secondary mirror 530 to correlate the projecting laser dots 118, 128, and 138 onto the same concentric ring 155 on the target display. As a result, the collimation process corrects the axial alignment error of the telescope 5 optical element by referencing the displacement of the projecting dots 118, 128, and 138 to the concentric rings 155 on the target display 150.

In some embodiments, the reflecting mirror 180 can be placed at near focal point 560 of the optical system 5, not necessarily on the focal point 560. If the reflecting mirror 180 is positioned intra-focus (short of focal point 180), it will make the reflected projecting three lasers 118, 128, and 138 on the target 150 spaced at a larger diameter apart, if the mirror 180 is positioned outra-focus (long of focal point 180), the lasers 118, 128, and 138 on the target 150 will appear closer together, and if the projecting laser dots 118, 128, and 138 are on the same spacing ring as the three projecting lasers 115, 125, and 135, for example, ring 155 in this case, then the reflecting mirror 180 is positioned at the focal point 560 of the collimating optical system 5. This can be useful to determine the precise focal point 560 location in telescope construction. In the case of the viewing device being a telescope, the reflecting mirror 180 can be placed at the eyepiece of the telescope 5. The reflecting mirror 180 may be a prism, a beam reflector, or the like. In the case that the reflecting mirror 180 is a beam splitter, the target display 150 may be placed at the back of the viewing device, instead of the front of the viewing device.

In some embodiments, the present invention does not include any reflecting mirror, Rather, the laser beams 115, 125 and 135 are reflected internally and are projected to the back or front of the viewing device.

The placement of the laser collimator 1 during collimation can be at any distance from the front of the OTA 510 to beyond the focal point distance of the collimating optical system. Preferably, the laser collimator 1 is positioned within arm reaching distance for ease of operation.

Figure 4A:
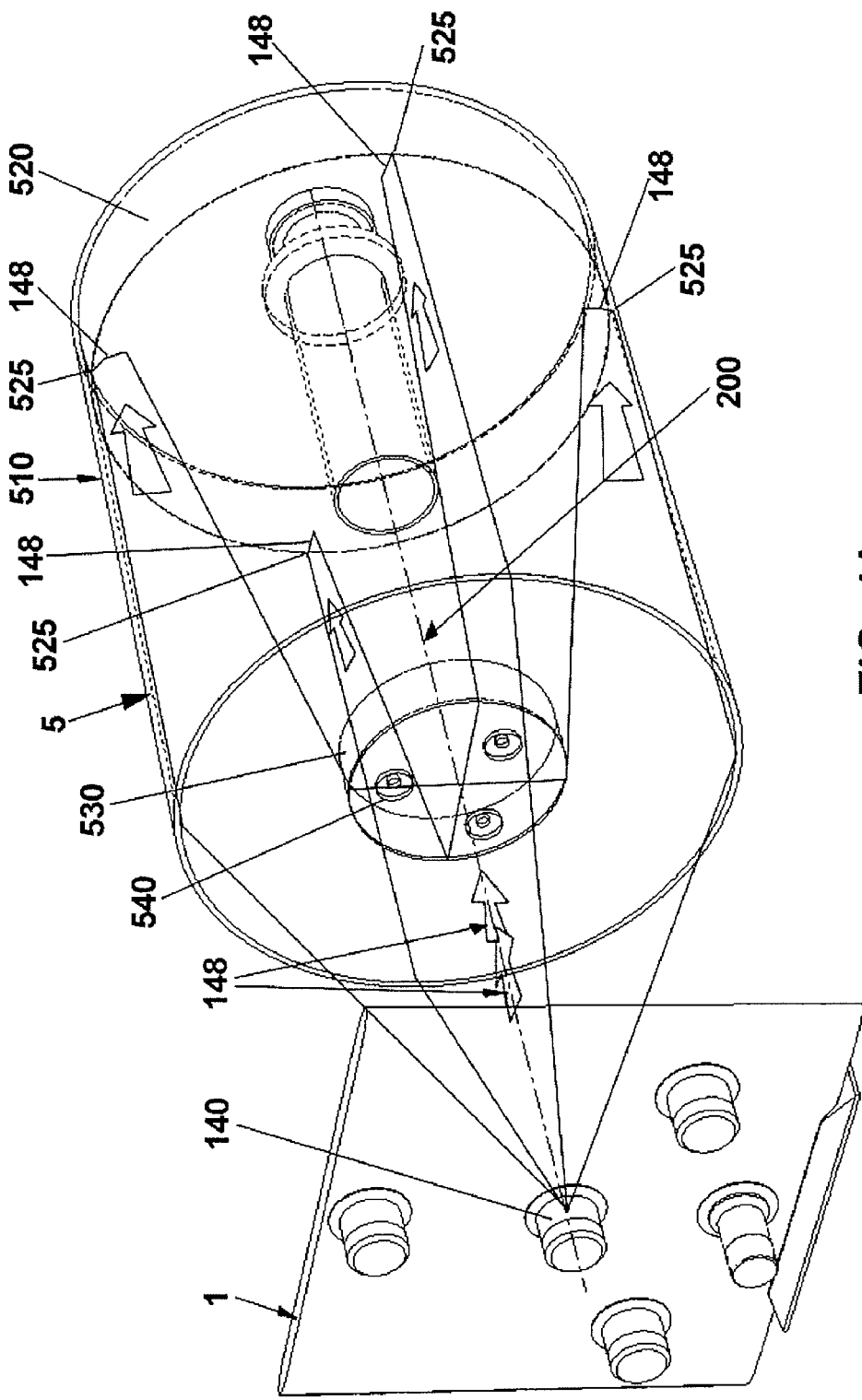
FIG. 4A is a perspective side view of a crosshair beam pattern tracing to a collimating SCT and FIG. 4B is a perspective side view of the returning crosshair beam pattern tracing back from the SCT to the laser collimator, according to some embodiments of the present invention.
Figure 4B:
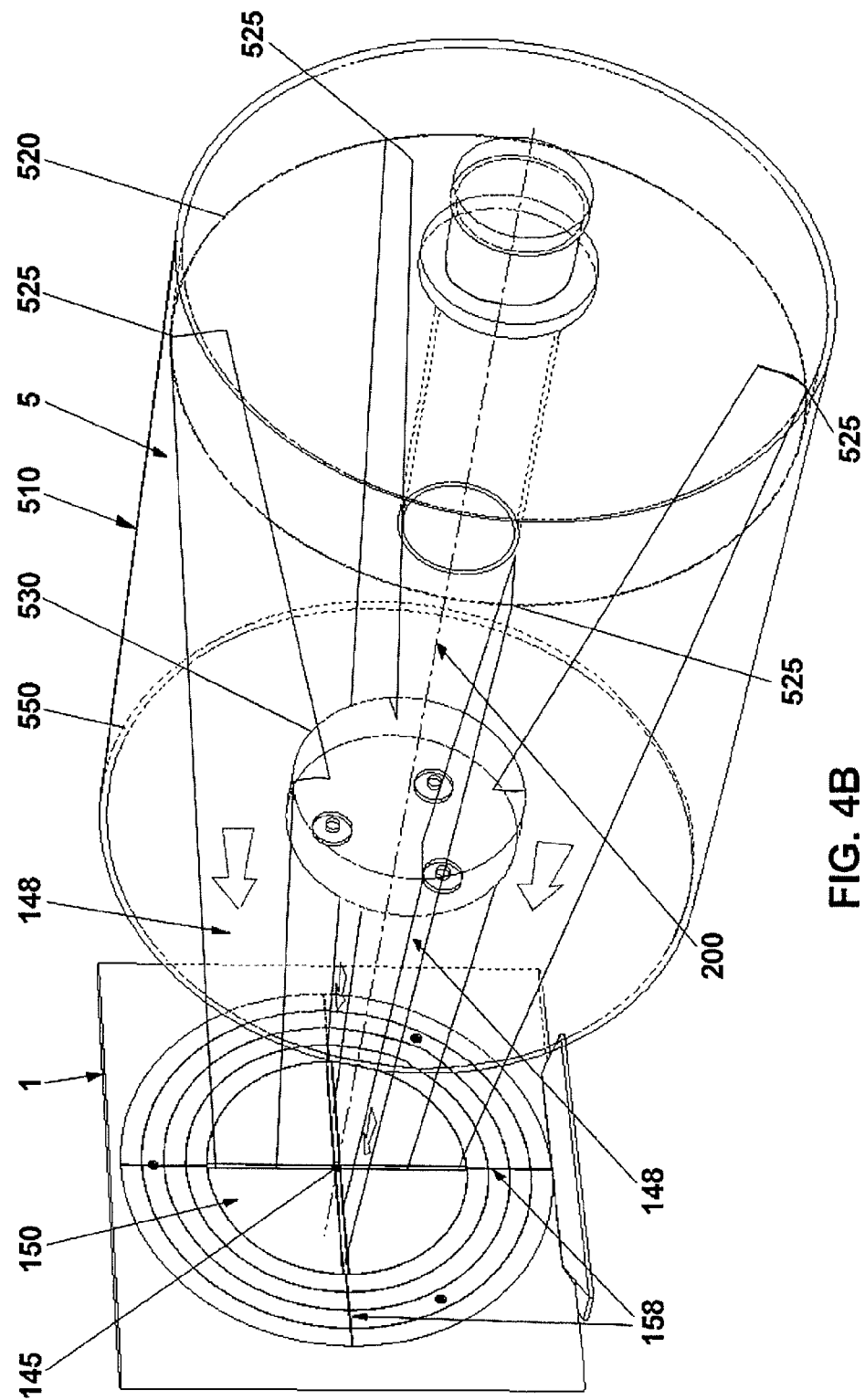

FIG. 4A is a perspective side view of a crosshair beam pattern tracing to a collimating SCT and FIG. 4B is a perspective side view of the returning crosshair beam pattern tracing back from the SCT to the laser collimator, according to some embodiments of the present invention. To achieve a more accurate collimation, the laser collimator 1 needs to co-align to the optical axis 200 of the collimating optical element, for example a telescope 5. Using the diffracted crosshair laser 140 emitting from the center of the laser collimator 145, the laser projects a diverging crosshair line 148 parallel to the three collimating laser beams (not shown for simplicity). As shown in FIG. 4A, the projecting crosshair laser beams 148 from the laser collimator 1 guides the laser collimator 1 to center point on the primary mirror 520 with pre marked (90 degrees apart) edges 525 or any means of internal or external visual queue corresponding to the close approximation on the same plane of the primary mirror 520. Once the laser collimator 1 is center pointed to the primary mirror 520 as shown in FIG. 4B, the reflected crosshair 148 from the primary mirror 520 can guide the telescope 5 to point back to the center of the graphic cross 158 on the target display 150. Multiple iterations of the aiming process may be required to achieve accurate aiming prior to the axial alignment of the optical element 530 in the telescope 5.

Figure 5:
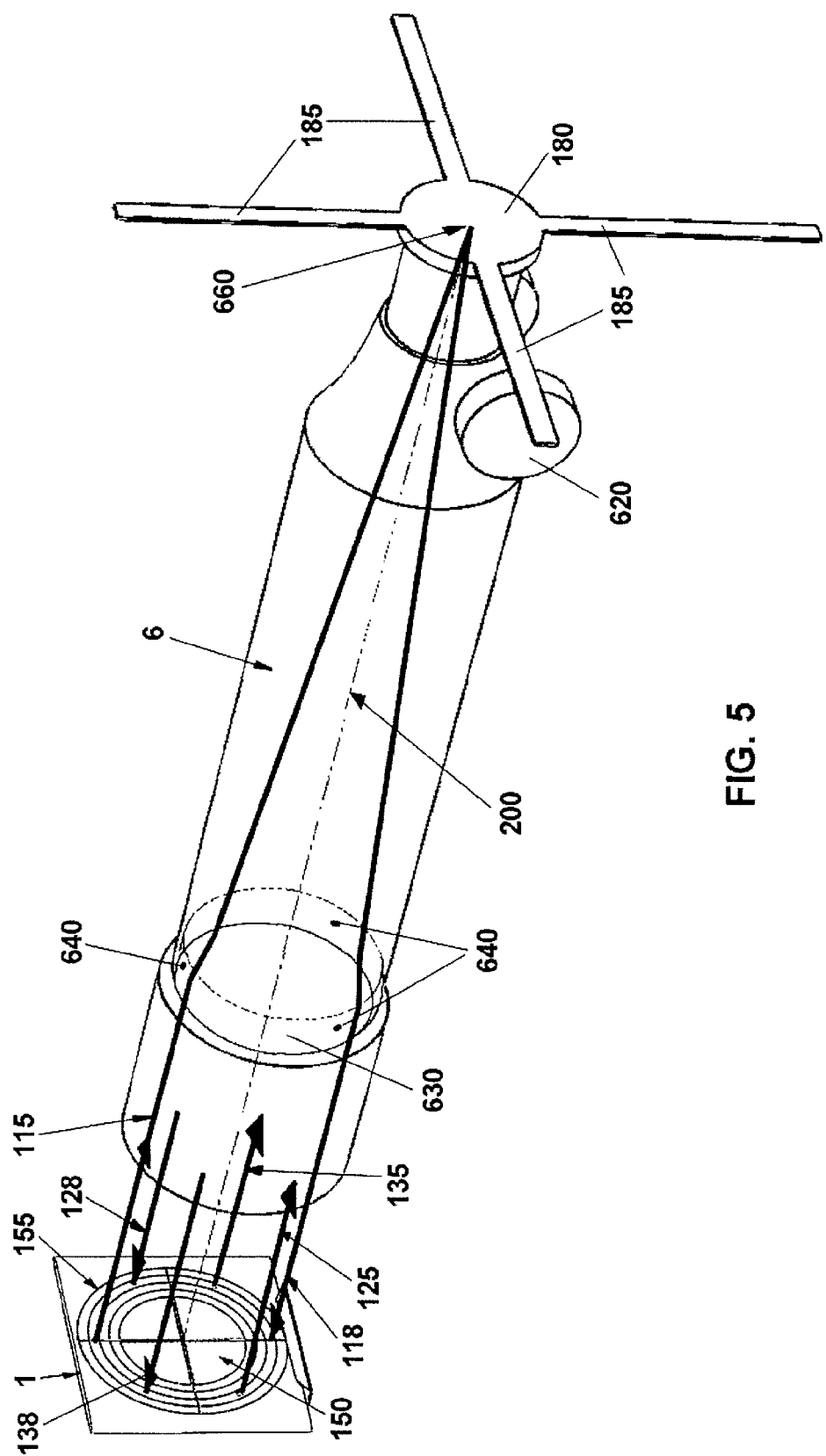
FIG. 5 is a perspective side view of three collimating laser beams tracing from a laser collimator to a collimating refractor telescope, according to some embodiments of the present invention.

FIG. 5 is a perspective side view of three collimating laser beams tracing from a laser collimator 1 to a collimating refractor telescope 6, according to some embodiments of the present invention. Collimating a refractor telescope 6 may be done in a similar fashion as in the Cassegrain Telescope, except the co-alignment reference from the laser collimator 1 to the refractor telescope's optical axis 200 is achieved by installing the external guiding tabs 185 on the same plane as the plano mirror 180 installed at the focuser and adjust the focuser knob 620 to near focal point 660 position. As illustrated in FIG. 5, three parallel lasers beams 115, 125, and 135 enter the objective lens 630 of the refractor telescope 6 and reflect back from the plano mirror 180 placed at the near focal point 660. The reflected laser beams 118, 128, and 138 then pass the objective lens 630 back to the target plate 150. Again, the goal of the collimation is to bring symmetry projection of the three projecting lasers 118, 128, and 138 on the same concentric ring, for example, ring 115 by adjusting the axial alignment screws 640 located on the outer rim of the objective lens assembly.

Figure 6A:
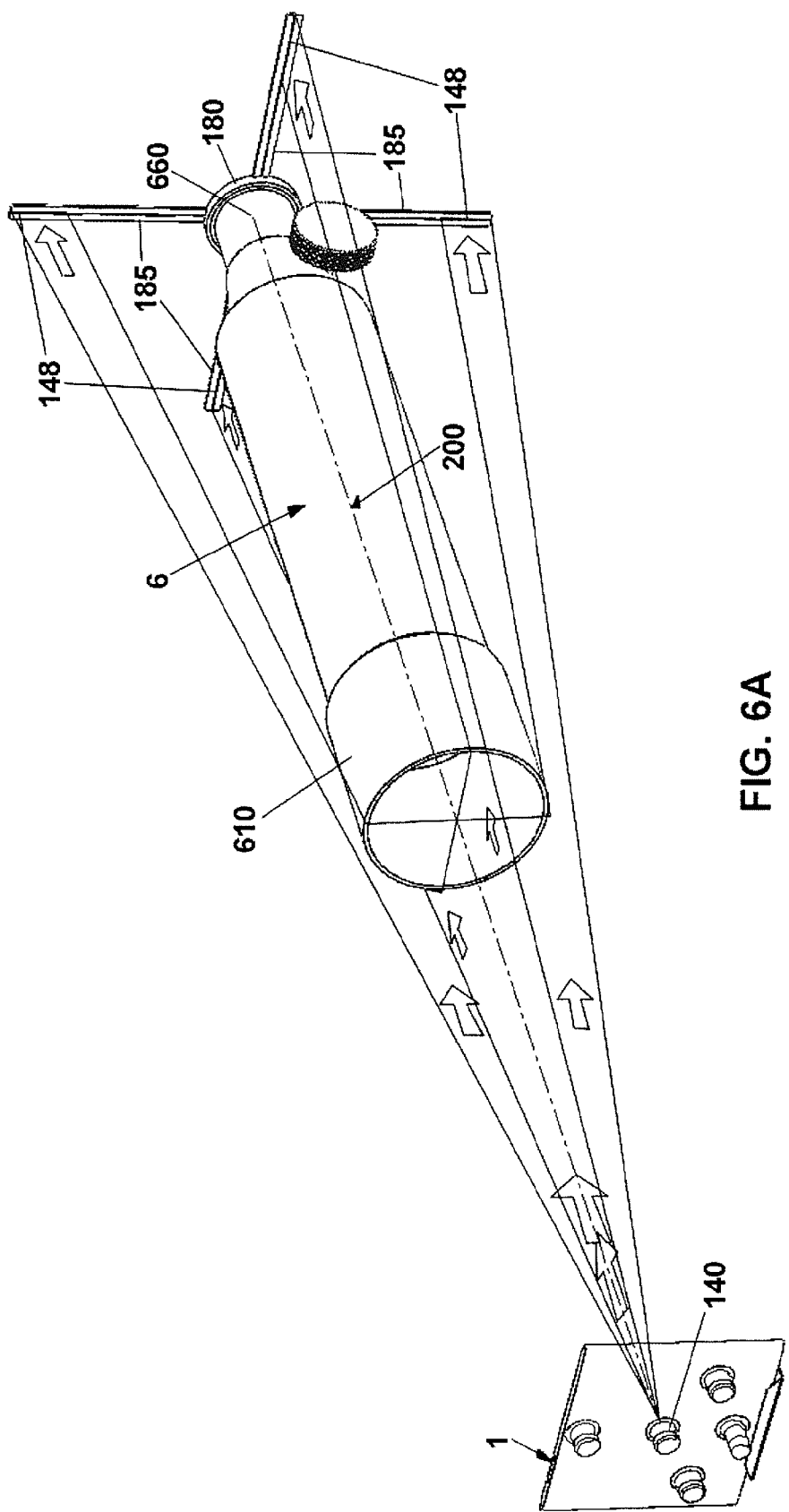
FIG. 6A is a perspective side view of a crosshair pattern beam tracing to a collimating refractor telescope and FIG. 6B is a perspective side view of the returning crosshair pattern laser beam tracing back from the refractor telescope to the laser collimator, according to some embodiments of the present invention.
Figure 6B:
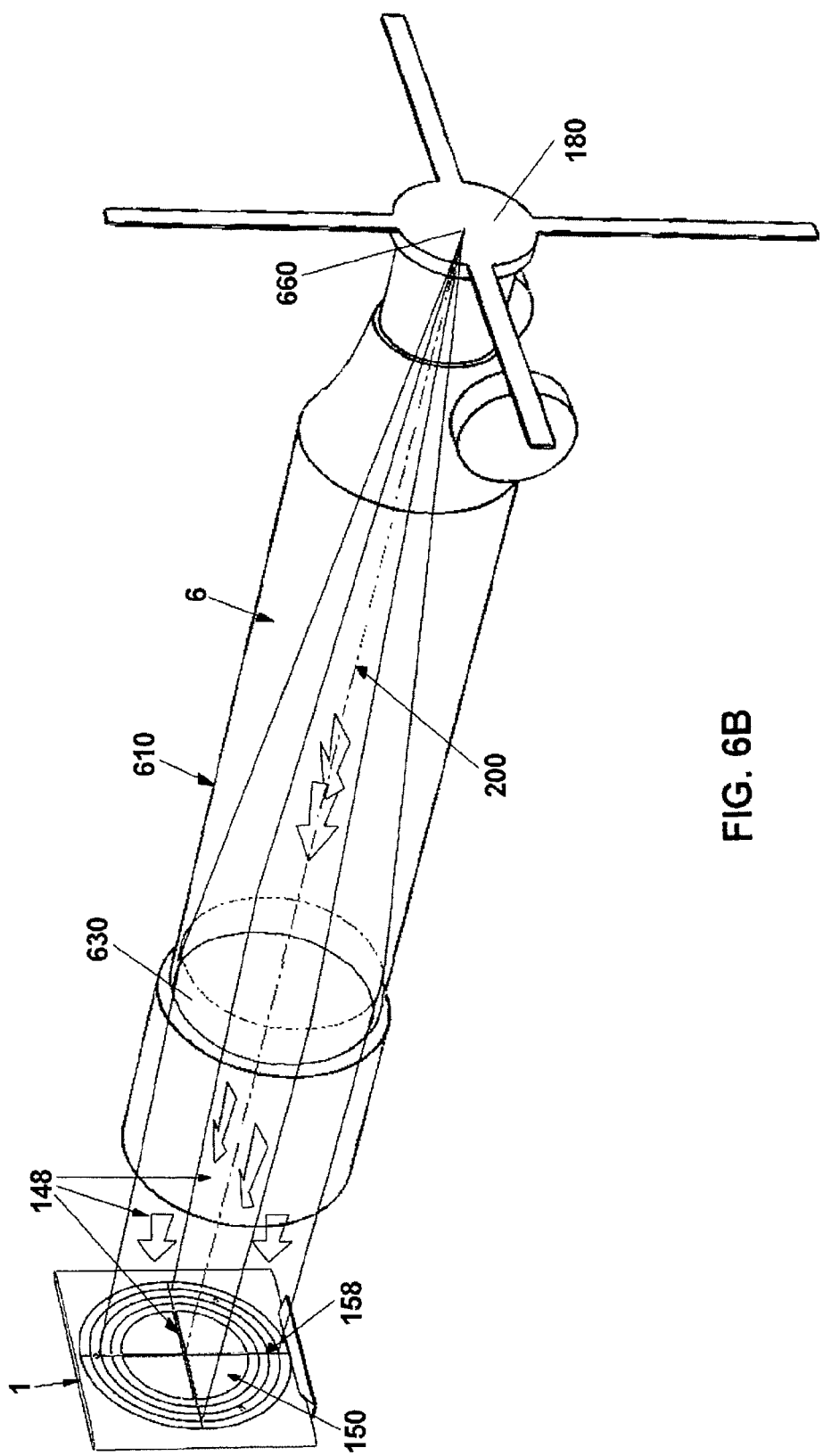

FIG. 6A is a perspective side view of a crosshair pattern beam tracing to a collimating refractor telescope and FIG. 6B is a perspective side view of the returning crosshair pattern laser beam tracing back from the refractor telescope to the laser collimator, according to some embodiments of the present invention. Prior to the collimation process of a refractor telescope, the laser collimator also needs to co-align to the optical axis 200 of the refractor telescope 6. In some embodiments, four (not limited to four) extending reference tabs 185 (in this case, 90 degrees apart) are placed at the same plane as the plano mirror 180, the crosshair laser 140 from the laser collimator 1 can then center point to the optical axis 200 of the refractor telescope to the corresponding tabs 185. As depicted in FIG. 6A, the front of the telescope tube 610 (shown in FIG. 5) crops the crosshair lines 148 and projects them beyond to the reference tabs 185. The user may position the laser collimator 1 at a proper distance allowing the cropped crosshair lines 148 to be visible on the tabs 185. As shown in FIG. 6B, the user adjusts the pointing of the telescope 6 pointing back to the laser collimator 1 by referencing the returning crosshair line 148 on the graphic cross 158 of the target plate 150. Multiple iteration of this co-alignment process may be required before and during the collimation process.

Figure 7:
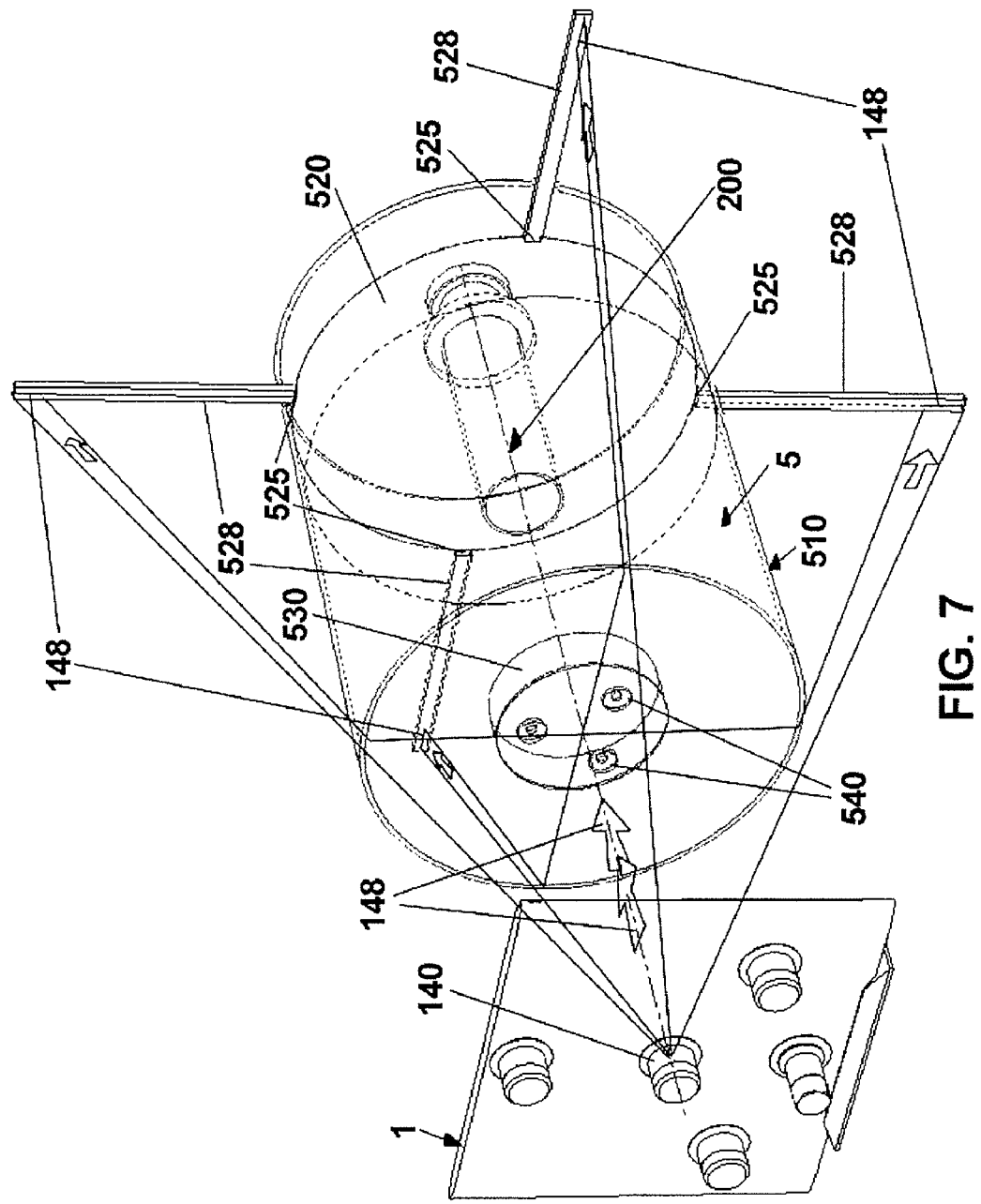
FIG. 7 is a perspective side view of a crosshair beam pattern for a SCT including some attached external tabs for markings, according to some embodiments of the present invention.

In some embodiments, during the co-alignment stage of a SCT 5, if the user decides not to mark the four edges of the primary mirror 520 on their SCT 5 due to accessibility or other factors, the user can attach external tabs 528 (three or four) corresponding to the marking positions 525 (, for example, 90 degrees apart) for crosshair alignment pointing reference as illustrate in FIG. 7. In this case, the cropped crosshair lasers 148 will project beyond the front of the OTA 510 onto the external tabs 528 for visual co-alignment reference.

In some embodiments, the tabs are placed on the non-adjustable optical elements on the viewing device as center-pointing external references. The tabs are positioned 90 degrees apart to simulate the aiming crosshair lines from the laser collimator in order to have the laser point square at the non-adjustable optical elements of the viewing device. For a SCT, the tabs are placed on the primary mirror 520, and for a refractor telescope, the tabs are placed near the focal point at the eyepiece position 660. See, for example, FIG. 6A for a refractor telescope, and FIG. 7 for a SCT, where the cropped crosshair 148 extends beyond the front of the telescope to the referencing tabs for pointing guide.

Figure 8:
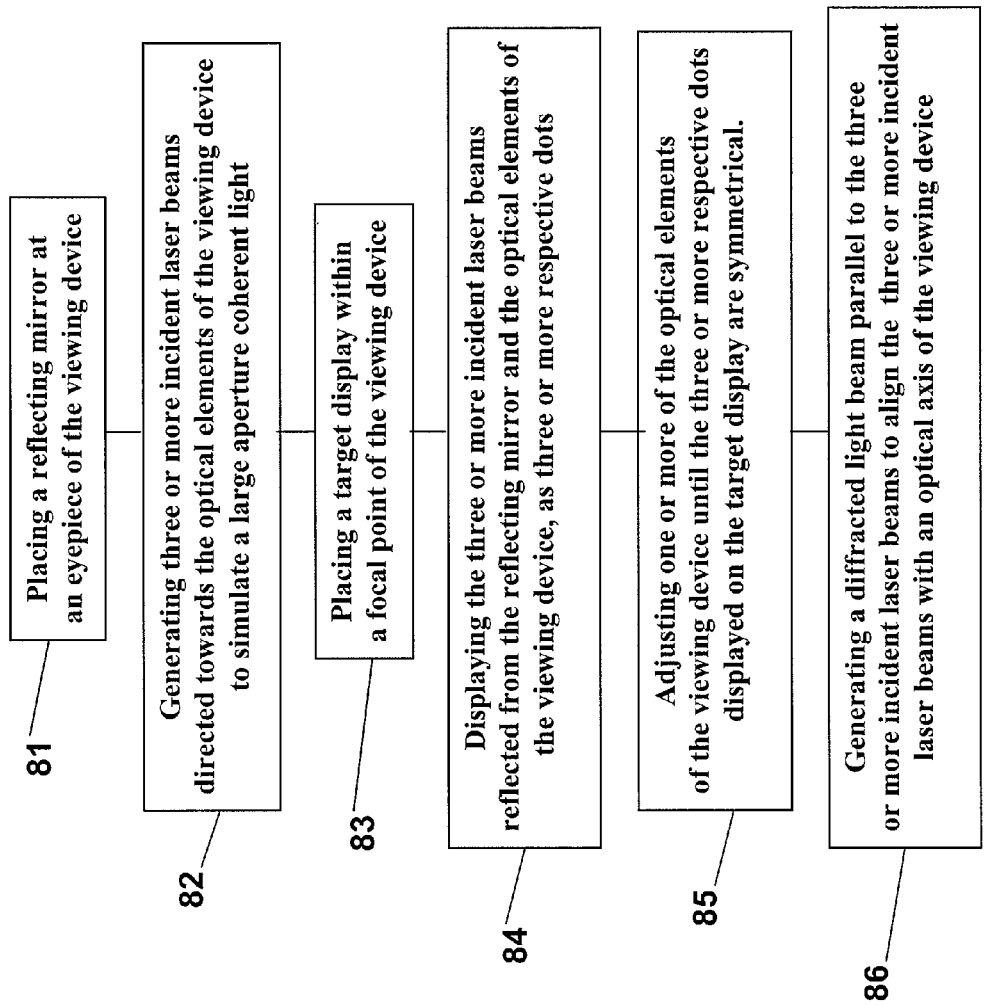
FIG. 8 is a simplified process flow for collimating a viewing device, according to some embodiments of the present invention.

FIG. 8 is a simplified process flow for collimating a viewing device, according to some embodiments of the present invention. As shown in block 81, a reflecting mirror, for example, a plano mirror is placed near the focal point of the viewing device. Three or more incident laser beams are generated, for example from three or more laser devices, directed towards the optical elements of the viewing device to simulate a large aperture coherent light, as shown in block 82. Additionally, a target display is placed in front of the viewing device to observe the reflected laser beams, as shown in block 83. In some embodiments, the target display may be a wall in a room or any surface suitable to display the reflected laser beam spots. In block 84, the three or more incident laser beams reflected from the reflecting mirror and the optical elements of the viewing device are displayed on the target display, as three or more respective dots. One or more of the optical elements of the viewing device, for example, the secondary mirror, is adjusted until the three or more respective dots are displayed on the target display are symmetrical, for example within the same ring on the target display, as shown in block 85. Optionally, as shown in block 86, a diffracted light beam is generated parallel to the three or more incident laser beams to align the three or more incident laser beams with an optical axis of the viewing device.

In some embodiments, the process for collimating optical elements of a viewing device includes generating three or more incident laser beams directed towards the optical elements of the viewing device; and simultaneously displaying the three or more incident laser beams reflected back from the optical elements of the viewing device to collimate the optical elements of the viewing device.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended claims.

What is claimed is:

1. A laser collimator for collimating optical elements of a viewing device comprising:
    three or more lasers positioned on a plane in front of the optical elements of the viewing device for generating three or more respective incident laser beams directed towards the optical elements to simulate a large aperture coherent light;
    a reflecting mirror positioned close to a focal point of the viewing device for reflecting the three or more incident laser beams; and
    a target display on the same plane or a plane parallel to the plane on which the three or more lasers are positioned for displaying the three or more incident laser beams reflected from the reflecting mirror and the optical elements of the viewing device, as three or more respective dots.

2. The laser collimator of claim 1, wherein one or more of the optical elements of the viewing device is adjusted until the three or more respective dots displayed on the target display are symmetrical.

3. The laser collimator of claim 1, further comprising an alignment laser positioned on the same plane on which the three or more lasers are positioned for generating a diffracted light beam parallel to the three or more incident laser beams to center align the laser collimator with an optical axis of the viewing device.

4. The laser collimator of claim 3, wherein the diffracted light beam is a crosshair light pattern.

5. The laser collimator of claim 4, further comprising three or more marking tabs to display and align the crosshair light pattern placed on the viewing device.

6. The laser collimator of claim 1, wherein the reflecting mirror is a plano mirror.

7. The laser collimator of claim 1, wherein the viewing device is a reflector telescope or a refractor telescope.

8. The laser collimator of claim 1, wherein the viewing device is one or more of the group consisting of a microscope, a binocular, a large aperture camera, and an imaging satellite.

9. A method for collimating optical elements of a viewing device comprising:
    placing a reflecting mirror near a focal point of the viewing device;
    generating three or more incident laser beams directed towards the optical elements of the viewing device to simulate a large aperture coherent light;
    displaying the three or more incident laser beams reflected from the reflecting mirror and the optical elements of the viewing device on a display, as three or more respective dots; and
    adjusting one or more of the optical elements of the viewing device until the three or more respective dots displayed on the display are symmetrical.

10. The method of claim 9, further comprising generating a diffracted light beam parallel to the three or more incident laser beams to center align the three or more incident laser beams with an optical axis of the viewing device.

11. The method of claim 10, wherein the diffracted light beam is a crosshair light pattern.

12. The method of claim 11, further comprising aligning the crosshair light pattern by displaying a reflected crosshair light pattern on three or more marking tabs placed on the viewing device.

13. The method of claim 9, wherein the reflecting mirror is a plano mirror.

14. The method of claim 9, wherein the viewing device is a reflector telescope or a refractor telescope.

15. The method of claim 9, wherein the viewing device is one or more of the group consisting of a microscope, a binocular, a large aperture camera, and an imaging satellite.

16. A method for collimating optical elements of a viewing device comprising:
    generating three or more incident laser beams directed towards the optical elements of the viewing device;
    simultaneously displaying the three or more incident laser beams reflected back from the optical elements of the viewing device on a target display to collimate the optical elements of the viewing device; and
    adjusting one or more of the optical elements of the viewing device until the three or more respective dots displayed on the target display are symmetrical.

17. The method of claim 16, further comprising generating a diffracted light beam parallel to the three or more incident laser beams to center align the three or more incident laser beams with an optical axis of the viewing device.

18. The method of claim 16, wherein the viewing device is a reflector telescope or a refractor telescope.

19. The method of claim 16, wherein the viewing device is one or more of the group consisting of a microscope, a binocular, a large aperture camera, and an imaging satellite.

* * * * *